United States Patent [19]

Atkin

[11] Patent Number: 4,687,261
[45] Date of Patent: Aug. 18, 1987

[54] TRACKS FOR TRACK-LAYING VEHICLES

[75] Inventor: Howard S. Atkin, Sutton Coldfield, England

[73] Assignee: Dunlop Limited, United Kingdom

[21] Appl. No.: 774,483

[22] Filed: Sep. 10, 1985

[30] Foreign Application Priority Data

Sep. 26, 1984 [GB] United Kingdom ............... 8424265

[51] Int. Cl.⁴ ............... B62D 55/088; B62D 55/096; B62D 55/275
[52] U.S. Cl. ........................... 305/57; 305/13; 305/35 EB; 305/38; 305/54; 474/153
[58] Field of Search ............... 305/13, 35 R, 35 EB, 305/38, 39, 41, 46, 50, 51, 57, 54

[56] References Cited

U.S. PATENT DOCUMENTS

| | | | |
|---|---|---|---|
| 2,332,313 | 10/1943 | Galanot | 305/54 X |
| 2,461,850 | 2/1949 | Slemmons | 305/38 X |
| 2,515,128 | 7/1950 | Lammertse | 305/38 |
| 2,592,541 | 4/1952 | Curtis | 305/57 X |
| 2,876,049 | 3/1959 | Bonmartini | 305/35 R |
| 3,472,563 | 10/1969 | Irgens | 305/35 EB |
| 3,730,013 | 5/1973 | Slemmons | 305/57 X |
| 3,897,980 | 8/1975 | Dester et al. | 305/57 |
| 3,944,296 | 3/1976 | Stampone | 305/38 X |
| 4,165,906 | 8/1979 | Fix | 305/51 |
| 4,353,586 | 10/1982 | Raquet et al. | 238/382 X |
| 4,368,929 | 1/1983 | Beyers et al. | 305/35 R X |

FOREIGN PATENT DOCUMENTS

| | | |
|---|---|---|
| 580626 | 9/1924 | France ............... 305/35 R |
| 292440 | 6/1928 | United Kingdom . |
| 2078640 | 1/1982 | United Kingdom . |
| 2104015 | 3/1983 | United Kingdom . |

Primary Examiner—David A. Scherbel
Assistant Examiner—Russell D. Stormer
Attorney, Agent, or Firm—Stevens, Davis, Miller & Mosher

[57] ABSTRACT

A light-weight track for a track-laying vehicle in which a flexible belt (11;64) has rigid driving members (28;61) secured to its inner surface for engagement with a drive sprocket (40;75). Successive driving members are staggered relative to the longitudinal center line of the belt so that successive driving members engage opposite sides of the sprocket, this arrangment helping to avoid trapping of loose stones or debris between the driving members and the sprocket.

16 Claims, 7 Drawing Figures

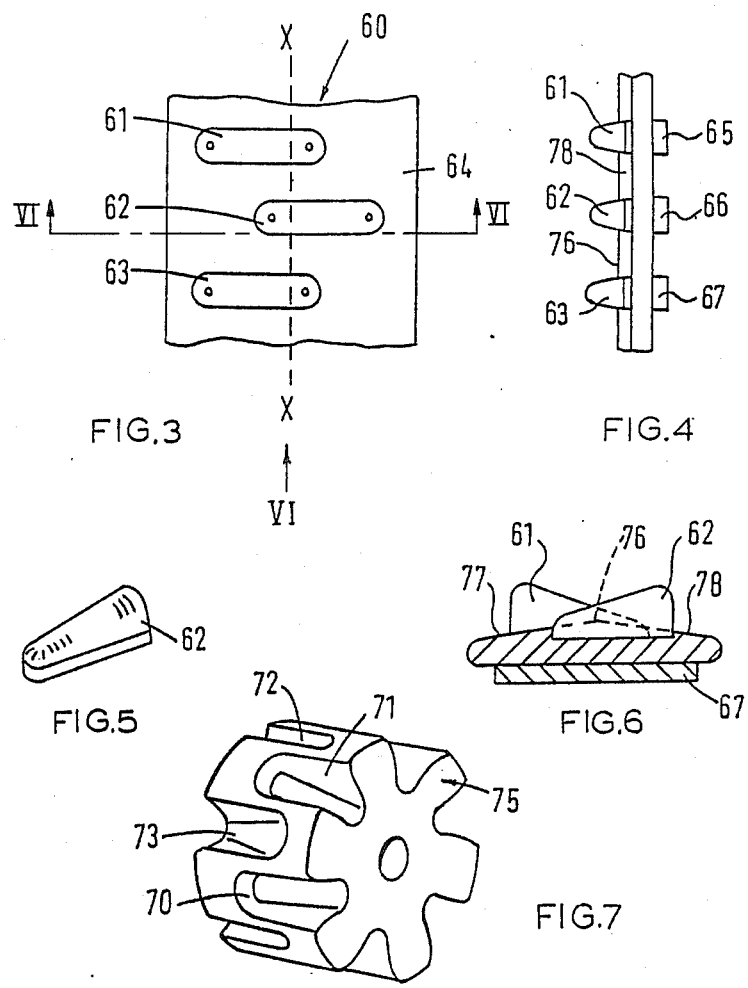

TRACKS FOR TRACK-LAYING VEHICLES

This invention relates to tracks for track-laying vehicles.

Most track-laying vehicles employ linked tracks made from cast steel. Tracks of this kind are heavy and very noisy, and these problems are particularly serious when it is desired to operate the vehicles at high speed.

One object of the invention is to provide a track for a track-laying vehicle which may be operated at high speed with reduced noise levels compared with the cast steel linked type of track, and which is resistant to damage or other interference with its function caused by loose stones or other debris.

It has been proposed, for example in U.K. Patent Specification No. 285,047 to form a track from an endless band of rubberized fabric on which guide and drive blocks are mounted on the inner surface to engage the teeth of a drive sprocket and ground-engaging tread pads are mounted on the outer surface by bolts which pass through the drive blocks, belt and tread pads. Such arrangements tend to be vulnerable to damage from loose stones and other debris which may become lodged in the teeth of the drive sprockets.

According to the invention, a track for a track-laying vehicle comprises a flexible belt arranged to pass around driving and load-supporting wheels of the vehicle and having inner rigid driving members secured to its inner surface to provide drive and guidance for the belt, successive driving members being staggered with respect to the center line of the track so that successive driving members are engageable with opposite sides of a driving sprocket to enable the belt to be driven only by alternate engagement of driving members with opposite sides of the sprocket.

Two embodiments of the invention will now be described, with reference to the accompanying diagrammatic drawings in which:

FIG. 3 is a plan view of the inner surface of a track showing an alternative construction;

FIG. 4 is a side view of the track shown in FIG. 3;

FIG. 5 is a detail perspective view of a driving member of the track shown in FIG. 3;

FIG. 6 is a longitudinal view in the direction of the arrow VI of FIG. 3, and

FIG. 7 is a perspective view of a driving sprocket for use with the track illustrated in FIGS. 3 to 6.

Figure 1:
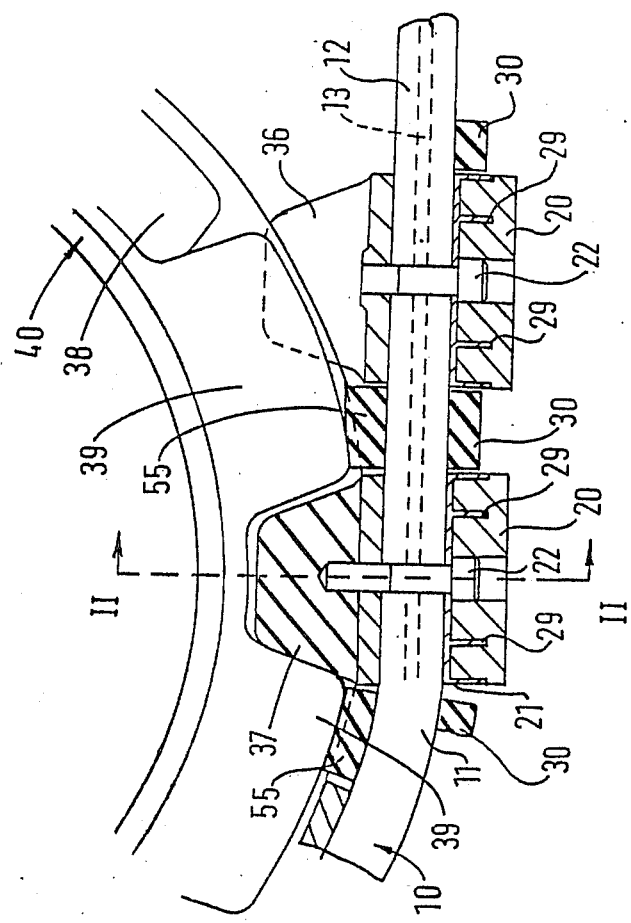
FIG. 1 is an end view, partly in cross-section of a track and driving sprocket assembly.
Figure 2:
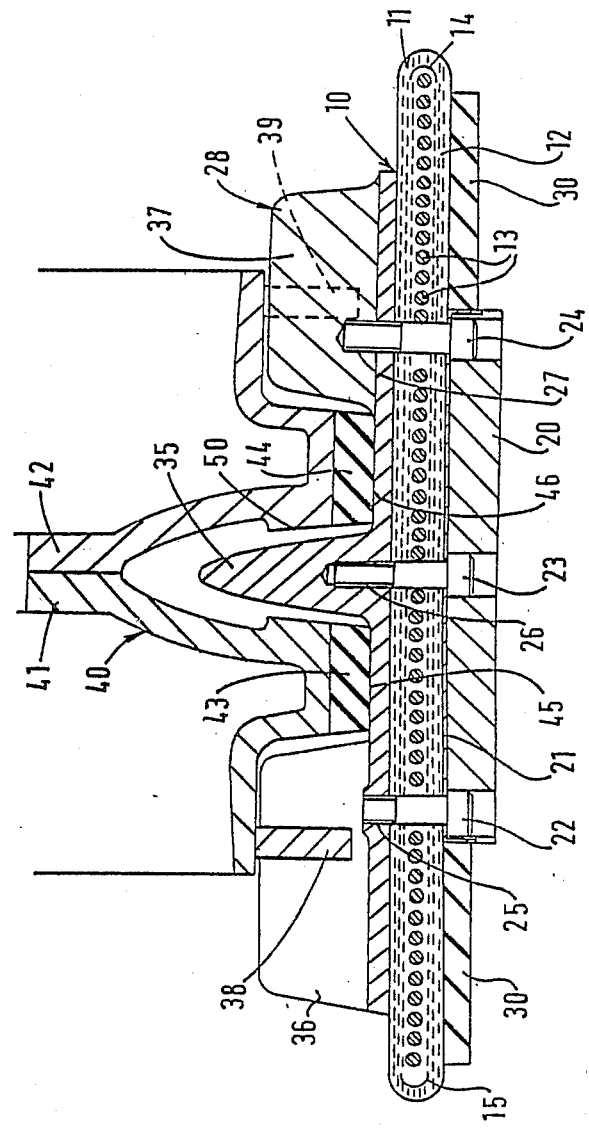
FIG. 2 is a transverse cross-section on the line II—II of FIG. 1.

The track 10 shown in FIGS. 1 and 2 comprises a rubber belt 11 which is formed in a generally conventional manner from plies of rubberized fabric 12 and comprises longitudinally extending cords 13 of high strength aromatic polyamide material such as "KEVLAR" (Registered Trade Mark). Adjacent the edges of the belt additional fabric strips 14,15 are incorporated to strengthen the edges and prevent splitting at the edges in service. The belt is assembled into an endless state by conventional splicing techniques with one or more joints.

Rigid rectangular tread pads 20 are formed as hard rubber mouldings within rectangular metal trays 21 and are secured to the belt 11 by three screws 22,23,24 which pass through holes in the belt and engage corresponding threaded holes 25,26,27 in an inner rigid driving member 28 on the inner surface of the belt 11. The trays 21 comprise reinforcing ribs 29 to stiffen the pads 20 in the transverse direction of the belt 11. The area of the outer surface of the belt 11 adjacent and surrounding the tread pads 20 is covered by raised rubber portions 30 which may be formed as part of the belt 11 in a single final moulding operation for the belt (forming effectively a patterned surface having sockets to accommodate the tread pad 20) or may be secured to the belt 11 after moulding of the belt, using an adhesive bonding system. The portions 30 are arranged to be raised to a lower height than the tread pads 20 so that when the vehicle is running on a metalled road only the tread pads 20 contact the road surface, while if the vehicle runs on soft ground the tread pads 20 sink into the ground and the portions 30 then also make contact with the ground surface to enhance the load-spreading effect.

The inner rigid driving members 28 each comprise a central horn 35 and have at one side a single drive dog 36 or 37 for engagement with teeth 38 or 39 respectively formed on opposite sides of a driving sprocket 40. The driving members 28 are arranged on the belt so that successive dogs 37, 37 lie first on one side then on the other side of the longitudinal centre line of the belt so as to engage teeth 38,39 on opposite sides of the sprocket 40. The driving sprocket 40 comprises light alloy castings 41,42 which meet and are bolted together in the mid-plane of the sprocket and each comprise a rubber tire 43,44 running on the inner surface of the associated portion 45,46 of the inner driving members. Lateral location of the track 10 is achieved by engagement of the horns 35 within a recess 50 formed between the two halves 41,42 of the driving sprocket 40.

The teeth 38,39 are formed as part of the light alloy castings 41,42 and are provided in the casting process with hollow spaces (not shown). This is for the purpose of enabling a vibration-damping material such as a plastic foam, e.g. polyurethane foam to be inserted into the spaces, for example by moulding in situ. Much of the noise generated in conventional tracks is created by the meshing of the track links and the teeth of the drive sprockets, and by the use of sprocket teeth filled with vibration damping material this noise can be substantially reduced. The horns 35 and driving members 36,37 maybe of light alloy or steel, or may be formed from rigid plastics materials such as glass fibre reinforced nylon or polyurethane.

The teeth 38,39 may alternatively be formed on separate components from the castings 41,42 and detachably secured to the castings. Also, while relatively narrow teeth 38,39 are illustrated in FIG. 2, the teeth may have greater width, extending over a greater width or the whole width of the respective drive dogs 36,37.

The alternating engagement of teeth and driving members on opposite sides of the belt centre line has the advantage that stones and other debris are more easily expelled than is the case with full-width tooth/drive dog engagement across the whole width of the belt.

An additional feature resulting in the reduction of noise is the provision on the inner surface of the belt 11 of raised areas formed by rubber blocks 55 which are moulded or bonded to the belt 11. The blocks 55 are of sufficient height to engage the teeth 38,39 of the sprocket as the belt passes around the sprocket and are thus held in compression against the teeth: this has an additional sound deadening effect.

While the track 10 is sufficiently flexible in the longitudinal sense to pass around the driving sprocket, the driving member 36 and the tread pads 20 effectively form the two flanges of a beam when considering the structure in the lateral sense, the portion of the belt 11 between the driving members 36 and tread pads 20 constituting the web of the beam which is held together as a unified structure by the screws 22,23,24. Thus the ground-contacting area of the track is very stiff in the lateral sense enabling the vertical load to be spread over a wide area and thus prevent undue penetration of the ground surface.

In the construction of the track 60 shown in FIGS. 3 to 6, rigid driving members 61,62,63 are secured to a belt 64 in a similar manner to the driving members illustrated in FIGS. 1 and 2, tread pads 65,66,67 being fastened beneath the belt in the manner previously described. The driving members 61,62,63 are staggered to lie on opposite sides of the central longitudinal line X—X as illustrated in FIG. 3 and are shaped as illustrated in FIG. 5 so that alternate driving members are engageable in sockets 70,71: 72,73 formed on opposite sides of a driving sprocket 75. This arrangement has the advantage that any loose stones or other debris which tend to collect on the inner surface of the belt are more readily expelled, and this effect is enhanced by forming the inner surface of the belt with a cross-sectional profile which is inclined towards each side of the track from a high point 76 in the region of the centre line of the track. The inclined surfaces 77 and 78 are seen most clearly in FIG. 6.

In the design of the track illustrated in FIGS. 3 to 7, the central region adjacent the line X—X of the belt is raised sufficiently to be engageable by the radially outer portion of the driving sprocket 75 to assist in noise suppression as described above, and if this sprocket is made from metal it is preferably provided with spaces filled with foam or other sound deadening material.

In the arrangement illustrated in FIGS. 3 to 6 it will be noted that the driving members 61,62 are wedge-shaped with their smaller ends directed into the correspondingly shaped notches of the drive sprocket 75 which may be formed as a single casting. The engagement of the driving members with the closed inner ends of the notches thus provides a lateral location function as well as drive transmission, and the inclined surfaces of the wedge-shaped notches assist in the clearance of debris as the sprocket rotates.

In both of the constructions described above, the belt may be made endless by a permanent bonding or vulcanizing technique according to well known conventional practice, or may be made by forming a 'halved' joint the two halves of which are clamped together between a driving member and tread pad. This latter technique is particularly useful for repairs in the field, and is also particularly suitable for making up a belt from a plurality of separate segments fastened end-to-end by halved joints.

The tracks in accordance with the invention as described above have the advantages of light weight, low noise generation, and durability. They are suitable for use at relatively high speeds, particularly for vehicles of up to 8 tons in weight. They are suitable for use both on metalled roads and also on soft ground.

I claim:

1. A track assembly for a track-laying vehicle comprising a flexible belt arranged to pass around a driving sprocket and load-supporting wheels of the vehicle said belt having inner rigid driving members secured to its inner surface to provide drive and guidance for the belt, successive driving members being staggered with respect to the center line of the track so that successive driving members are engageable with opposite sides of a driving sprocket to enable the belt to be driven only by alternate engagement of driving members with opposite sides of the driving sprocket, the driving sprocket having wedge-shaped notches formed alternately in opposite side faces of the sprocket for engagement with the successive driving members, providing both drive and lateral guidance, the driving members and the notches being complementarily shaped with the smaller ends of the driving members directed into the notches.

2. A track according to claim 1 wherein the inner rigid driving members are secured to the belt by fastening members extending through the belt.

3. A track according to claim 1 wherein rigid driving members are aligned substantially at right angles to the longitudinal direction of the track.

4. A track according to claim 1 wherein rigid tread pads are secured to the outer surface of the belt by fastening members extending through the belt to engage the inner rigid members, the arrangement being such that the belt may flex between the tread pads to provide longitudinal flexibility but is held rigidly by the inner rigid members and the tread pads to provide a laterally stiff structure.

5. A track according to claim 4 wherein at least one pair of inner rigid driving members and rigid tread pads is clamped together by the fastening members so as to secure and reinforce a junction area of the belt.

6. A track according to claim 1 wherein the belt is reinforced with longitudinally extending cords of high strength material such as an aromatic polyamide bonded in a rubber belt structure.

7. A track according to claim 1 wherein the tread pads each comprise a rigid backing member in the form of a shallow tray in which a rubber block is moulded.

8. A track according to claim 1 wherein the inner surface of the belt between successive driving members is raised so as to be engageable with the teeth of a driving sprocket.

9. A track according to claim 1 wherein the areas between successive rigid tread pads are raised to provide a ground-engaging tread of lower height than that of the rigid tread pads.

10. A track according to claim 1 wherein the inner surface of the belt has a cross-sectional profile which is inclined relative to its outer surface, to reduce any tendency for debris to be trapped between the driving member and a driving sprocket.

11. A track according to claim 10 wherein the said profile is inclined toward each side of the track from a high point in the region of the centre line of the track.

12. A track assembly comprising a track in the form of a flexible belt having inner rigid driving members secured to its inner surface to provide drive and guidance for the belt and a driving sprocket having teeth complementary with the driving members, successive driving members being staggered with respect to the center line of the track so that successive driving members are engageable with opposite sides of the driving sprocket to enable the belt to be driven only by alternate engagement of driving members with opposite sides of the sprocket, the driving sprocket having wedge-shaped notches formed alternately in opposite side faces of the sprocket for engagement with the successive driving members, providing both drive and lateral guidance, the driving members and the notches being complementarily shaped with the smaller ends of the driving members directed into the notches.

13. A track assembly according to claim 12 wherein the sprocket teeth are of sufficient height to contact the belt between the driving members for at least part of the passage of the belt around the sprocket.

14. A track assembly according to claim 1 in which the driving sprocket has teeth for engagement with the driving members, said sprocket being formed with hollow spaced in said teeth, said hollow spaces containing a vibration damping material.

15. The track assembly of claim 1, in which the axial inner ends of the notches of the driving sprocket are interdigitated around the periphery thereof.

16. The track assembly of claim 12, in which the axial inner ends of the notches of the driving sprocket are interdigitated around the periphery thereof.

* * * * *